Nov. 17, 1925.
F. H. STANWOOD
STEP TREAD
Filed Feb. 21, 1921
1,561,668
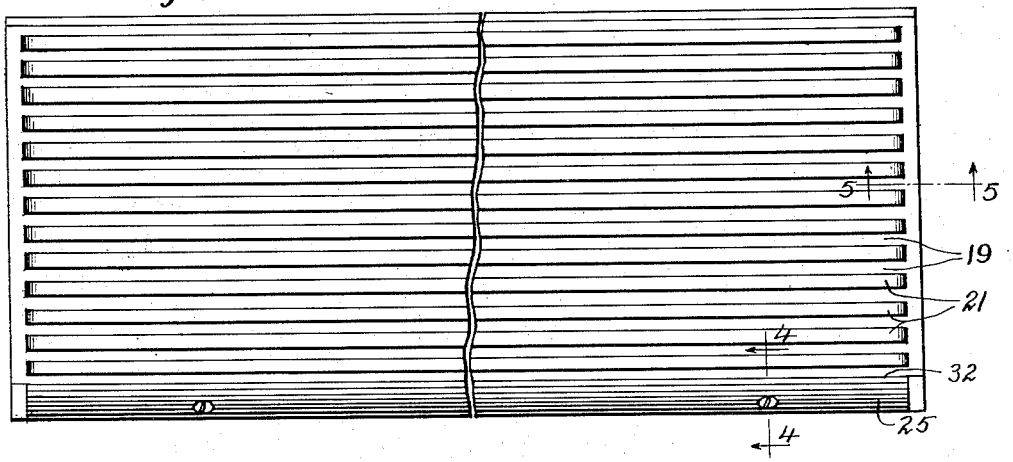
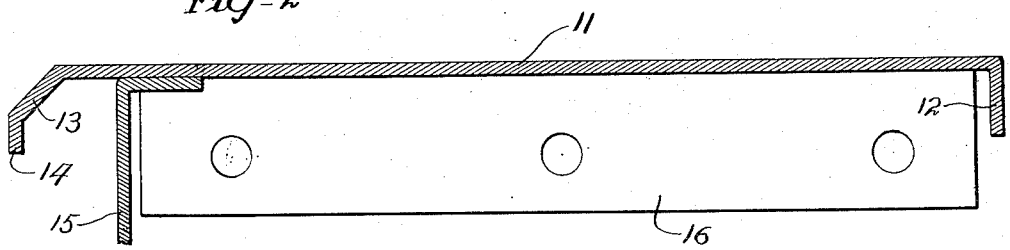
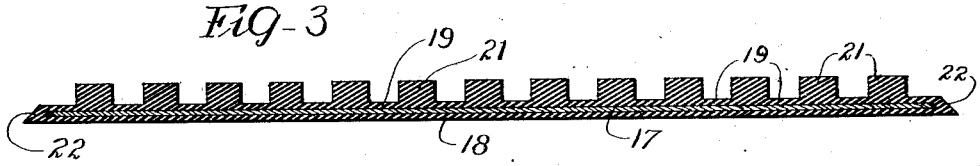
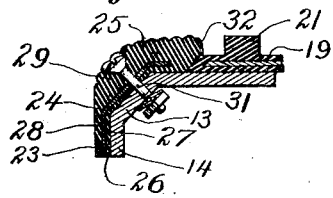
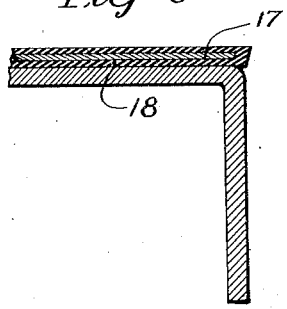
Inventor
Frank H. Stanwood
By Munday, Clarke & Carpenter
Attys Patented Nov. 17, 1925.

1,561,668

UNITED STATES PATENT OFFICE.

FRANK H. STANWOOD, OF WILMETTE, ILLINOIS, ASSIGNOR TO STANWOOD EQUIPMENT COMPANY, OF CHICAGO, ILLINOIS, A CORPORATION OF MAINE.

STEP TREAD.

Application filed February 21, 1921. Serial No. 446,785.

*To all whom it may concern:*

Be it known that I, FRANK H. STANWOOD, a citizen of the United States, residing in Wilmette, in the county of Cook and State of Illinois, have invented a new and useful Improvement in Step Treads, of which the following is a specification.

This invention relates in general to safety step plates or treads for use in vehicles, such as railway cars, automobiles and the like, and has for a principal object the provision of a tread consisting in the main of rubber reinforced by metal sheets and so constructed that its parts may be arranged and rearranged.

Another and highly important object of the invention is the provision of a nosing separate from the body so that the nosing may be separately replaced without requiring replacement of the entire tread.

My invention contemplates in the foregoing connections the provision of a main tread which may be reversed in position to permit the back and relatively unworn part of the tread to occupy a front position after the front has been worn in service, and in this connection contemplates also the provision of a nosing adapted to mate with either the front or the back and be separately replaceable should it be required, in a particular instance, to endure relatively harder service than is demanded of the main portion.

Another important object of the invention is the provision of a tread and nosing separately constructed and arrangeable together to form the complete step protection, said nosing and tread being adapted to mate tightly in engagement in position to present the appearance of a single unitary structure and also to prevent entrance of moisture and dirt between the parts or to work in between the parts and the step on which they are positioned.

Another object of the invention is the provision of such a construction, which will be self-cleaning in action and which will effectually prevent slipping of the persons stepping upon the step in entering or leaving the vehicle.

Numerous other objects and advantages of the invention will be apparent as it is better understood from the following description, which, taken in connection with the accompanying drawings, discloses a preferred embodiment thereof.

Referring to the drawing,

Figure 1 is a top plan view of a step tread embodying my present invention;

Fig. 2 is a transverse sectional view of a railway car step upon which the tread may be positioned;

Fig. 3 is a similar section taken through the main tread member;

Fig. 4 is a section taken substantially on the line 4—4 of Fig. 1; and

Fig. 5 is a section taken substantially on the line 5—5 of Fig. 1.

For the purpose of illustrating my invention I have shown on the drawing a car step comprising a top or tread member 11 having a downturned flange 12 at its rear edge and a downwardly inclined flange part 13 at its front edge, which terminates in a downwardly extending vertical part 14. This tread may be supported in any suitable manner as by the riser 15 at the front and the end flanges 16 adapted to be secured to appropriate parts. The tread selected for the purpose of illustrating the invention as an embodiment of it comprises a main member shown in Fig. 3 and a nosing member shown in Fig. 4. The main member is provided with an internal reinforcing metal sheet 17 which may be constructed in accordance with the like member in my earlier Patent No. 1,185,445 and which is preferably vulcanized to the body material as in my later Patent No. 1,257,144. This tread is provided with a covering 18 beneath it of rubber composition, rubberized cloth or the like and with a covering above it indicated at 19 upon which is provided upwardly extending isolated ribs 21.

These ribs are arranged in parallelism and are non-intersecting so that any dirt accumulating between them may work out at the ends merely by the motion of the vehicle or be pushed out should occasion require it. The front and rear edges 22 of the plate are of like form and construction and consist of a joint between the upper and lower coverings beveled as may be seen in Fig. 3. The nosing also is provided with an internal reinforcing sheet 23 bent at 24 and 25 to correspond to the shape of the step edge and provided with the under rubber covering sheet 26, it being understood that rubber composition and rubberized cloth may be used of course if desired.

The material on the outside of the reinforcing member 23 is relatively thin opposite the vertical part 27 of the metal reinforce 23, as indicated at 28, and thereabove is thickened and corrugated, as indicated at 29. This thickened part at the top and over the edge of the step is substantially of a depth equal to the height of the ribs so that the coating forms substantially a continuation of the plane of the tops of the ribs.

The nosing is held in place by fastening bolts 31 extending through the rubber part 25, plate 23 and undercoating or covering 26, and the step itself. The apertures for the bolts 31 are so arranged with respect to the main tread member that the front edges 22 thereof are disposed beneath the rear edge 32 of the nosing whereupon tightening of the bolts 31 draws down the adjacent edge of the nosing into pressure surface contact with the bevel edge 22 of the main member, thereby sealing the space between the two and giving to the entire construction the appearance of a single continuous member. This construction also serves to prevent dirt and moisture working in beneath the nosing and main members. It is manifest that the main member may be turned edge for edge and mate with the same or substituted nosing of like construction thereby insuring maximum economy in service.

It is thought that the invention and many of its attendant advantages will be undersood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A safety step tread for steps of automobiles, railway cars and the like, comprising a reversible nonslipping covering having on its upper surface a series of upstanding yieldable ribs and provided on its front and rear edges with a nosing-engaging marginal portion, and a separate non-slipping nosing member adapted to overlie and closely engage either of said marginal portions of said reversible covering in edge to edge contact, to provide a maximum of wear of said step tread.

2. A safety step tread for the steps of automobiles, railway cars and the like, comprising a main body part, and a separate nosing part, each presenting irregular friction safety surfaces and arrangeable upon a step with the adjacent edges in pressed surface contact.

3. A safety step tread for steps of automobiles, railway cars and the like, comprising an internal metal body plate, a reversible non-slipping covering completely surrounding and vulcanized to said plate and having on its upper surface a series of upstanding yieldable ribs, said covering being provided on its front and rear edges with beveled nosing engaging portions, and a separate non-slipping nosing member adapted to overlie and closely engage either of said front and rear beveled portions of said reversible covering in edge to edge contact, to permit said covering and said nosing member to be removably secured to the step by a single fastening means to provide a maximum of wear of said step tread.

4. A safety step tread for the steps of automobiles, railway cars and the like, comprising a main tread member adapted to overlie a substantially flat step and having upstanding isolated ribs, an internal reinforcing member, and a nosing member adapted to extend over the front edge of the step and overlying the adjacent edge of the main tread member.

5. A safety step tread for steps of automobiles, railway cars and the like, comprising an internal metal body plate, a reversible non-slipping covering completely surrounding and vulcanized to said plate and having on its upper surface a series of upstanding yieldable ribs, said covering being provided on its front and rear edges with beveled nosing engaging portions, a separate non-slipping nosing member adapted to overlie and closely engage either of said front and rear beveled portions of said reversible covering, to permit said covering and said nosing member to be removably secured to the step by a single fastening means to provide a maximum of wear of said step tread, and means for removably securing said nosing member to the step.

6. A safety step tread for the steps of automobiles, railway cars and the like, comprising a main tread member of soft yielding material molded about a reinforcing plate, and a separate nosing member overlying and mating at the front edge with the main tread member and of similar material and similarly reinforced.

7. A nosing member for a car step, automobile running board or the like, comprising a metal sheet bent to conform to the edge of the step on which it is attached, a coating of yielding friction material disposed thereabout, said coating being of substantial thickness above said plate, and means extending through said material and said plate and adapted to extend through the step to fasten the same in place.

8. A nosing, comprising a metal sheet bent to conform to the edge of a car step, automobile running board or the like, and a body of rubber composition enveloping the same and providing a thickened corrugated upper face said body being vulcanized to said metal and adhering thereabout by reason of such vulcanization, and means for removably securing said nosing to said step and running board.

FRANK H. STANWOOD.